United States Patent

Buchwalter et al.

[11] Patent Number: 5,858,943
[45] Date of Patent: Jan. 12, 1999

[54] GEL FOR LOCALIZED REMOVAL OF REWORKABLE ENCAPSULANT

[75] Inventors: Stephen Leslie Buchwalter, Hopewell Junction, N.Y.; Jeffrey Donald Gelorme, Plainville; Nancy C. LaBianca, Yalesville, both of Conn.

[73] Assignee: International Business Machines Corporation, Armonk, N.Y.

[21] Appl. No.: 891,816

[22] Filed: Jul. 14, 1997

Related U.S. Application Data

[63] Continuation-in-part of Ser. No. 638,250, Apr. 26, 1996, abandoned.

[51] Int. Cl.$^6$ ....................................................... C09D 9/00
[52] U.S. Cl. ............................... 510/204; 134/38; 134/40
[58] Field of Search ............................. 510/204; 134/38, 134/40

[56] References Cited

U.S. PATENT DOCUMENTS

| | | | |
|---|---|---|---|
| 4,438,692 | 3/1984 | Ancher et al. | 510/204 X |
| 4,770,714 | 9/1988 | Buchwald et al. | 510/204 X |
| 5,185,235 | 2/1993 | Sato et al. | 430/331 |
| 5,244,507 | 9/1993 | Rowe | 134/38 |

*Primary Examiner*—Michael Lusignan
*Attorney, Agent, or Firm*—Daniel P. Morris

[57] ABSTRACT

Reworkable encapsulant formulations are being developed to allow recovery of part-good microelectronic assemblies. According to this invention, a gelled form of the solvent is useful for removing the reworkable encapsulant from a specific region of the assemblies without affecting components on the assembly which do not need to be reworked. This novel method eliminates expensive tooling that would otherwise be required to handle the solvent.

7 Claims, No Drawings

GEL FOR LOCALIZED REMOVAL OF REWORKABLE ENCAPSULANT

This is a continuation-in-part of application Ser. No. 08/638,250, filed Apr. 26, 1996, abandoned.

FIELD OF THE INVENTION

The invention pertains to a chemical composition useful for removing cured, reworkable epoxy encapsulant.

BACKGROUND

A new family of epoxy encapsulants has been developed and is the subject of a pending IBM application. These cleavable epoxy compositions are finding use in microelectronic applications in which the ability to rework part-good assemblies is advantageous. Normally, cured epoxy encapsulants are not reworkable because they are intractable thermosets. These new encapsulants are designed to be reworkable by dissolving the encapsulants in special liquid compositions.

In order to use these new reworkable epoxy encapsulants, an appropriate process needs to be developed for actually removing the encapsulant. The available methods for applying the liquid compositions are immersing the assembly to be reworked in a container containing the heated liquid; directing a spray of the heated liquid at the microelectronic assembly; or applying a small amount of the liquid on a brush and applying the brush to the assembly, while heating the latter on a hot stage. Each of these methods have disadvantages. Immersion of the assembly exposes the whole assembly to the liquid although usually only one part of the assembly needs to be reworked. A directed spray requires tooling to supply the liquid to a spray fixture which has to be designed specifically to contain the spray at the appropriate site of each microelectronic assembly to be reworked. The brushing action can be abrasive to solder mask materials at or adjacent to the site being reworked, and the amount of liquid carried by the brush is limited which slows the rework process.

SUMMARY

Our invention is to use a thickened or gelled formulation of the liquid for encapsulant removal. The gel can be applied to one specific region of the assembly to be reworked without exposing any other components to the rework process. No tooling is required other than a hot plate under the assembly. No abrasion is needed because the solvent in the gel completely dissolves the reworkable encapsulant.

DETAILED DESCRIPTION

The gel composition consists of three essential components: 1) an acid to break the crosslinks in the reworkable encapsulant; 2) a solvent to dissolve the uncrosslinked material and disperse the inorganic filler particles; and 3) a thickener to gel the mixture. These three components are simply blended together. Proportions are 1–20 parts by weight acid, 100 parts solvent, and 2–400 parts thickener. The acid can be any of a number of acids as disclosed in our pending patent application such as p-toluenesulfonic acid or methanesulfonic acid. The preferred acid is methanesulfonic acid. The solvent can also be any of a number of primary alcohols or blends of primary alcohols with other solvents such as ethanol, xylene/1-butanol/ethylene glycol, or 2,2,2-trifluoroethanol. The preferred solvent is 2,2,2-trifluoroethanol. The thickener can be any starch or cellulose derivative which dissolves in the solvent/acid mixture and gels the mixture. The preferred cellulose thickener is a carboxymethyl cellulose sold by FMC Corporation as Aquateric CD910. The thickener can also be one of the known thixotropic agents such as treated fumed silicas. The preferred filmed silica is Cab-O-Sil TS720 from the Cabot Corporation.

EXAMPLE 1

Thickener (18 grams FMC Aquateric CD910) was dissolved in 6 g of 2,2,2-trfluoroethanol with moderate heating. Methanesulfonic acid (0.72 g of 99% pure material) was then blended in. Test circuit cards with samples of cured reworkable encapsulant were preheated to 75° C. on a hot plate. The gel was applied in small amounts with an applicator stick to cover the area of encapsulant to be removed. The gel skins over and the solvent can be observed to bubble slightly under the skin. After a few minutes the encapsulant is softened and then dissolves. The gel and dissolved encapsulant are rinsed with copious amounts of isopropyl alcohol. Remaining traces of encapsulant were removed by a second application of gel, followed by a second rinse.

EXAMPLE 2

2,2,2-Trifluoroethanol, 100 parts by weight, and methanesulfonic acid, 5.5 parts by weight, were mixed together. Cab-O-Sil TS720, a treated fumed silica from Cabot Corporation, was added and blended in by hand until the mixture was a thixotropic gel, 6.6 parts by weight. The gel maintained its viscosity on a glass slide at 80° C. The mixture was loaded in plastic syringes for easy dispensing and stored at room temperature for I month. No change in appearance or viscosity was observed. The gel was dispensed on samples of cured reworkable encapsulant on test circuit cards. The cards were heated on a hotplate at 60°–70° C. The encapsulant was cleanly removed in 1–2 applications with a final rinse with solvent such as isopropyl alcohol.

We claim:

1. A composition of matter for spot removal of a crosslinked material, said composition of matter being comprised of an effective removal amount of an acid to break the crosslinks of said crosslinked material to form an uncrosslinked material, an effective removal amount of a solvent for said uncrosslinked material, and an effective removal amount of a thickening agent to gel said composition of matter.

2. A composition of matter according to claim 1 wherein the crosslinked material to be removed is a cleavable epoxy formulation.

3. A composition of matter according to claim 2 wherein said solvent is 2,2,2-trifluoroethanol.

4. A composition of matter according to claim 3 wherein said acid is methanesulfonic acid.

5. A composition of matter according to claim 4 wherein said thickener is a carboxymethylcellulose derivative.

6. A composition of matter according to claim 4 wherein said thickener is a fumed silica.

7. The composition of claim 1 wherein there is from about 1 to about 20 parts by weight of said acid, about 100 parts of said solvent and from about 2 to about 400 parts of said thickening agent.

* * * * *